Figure 1:
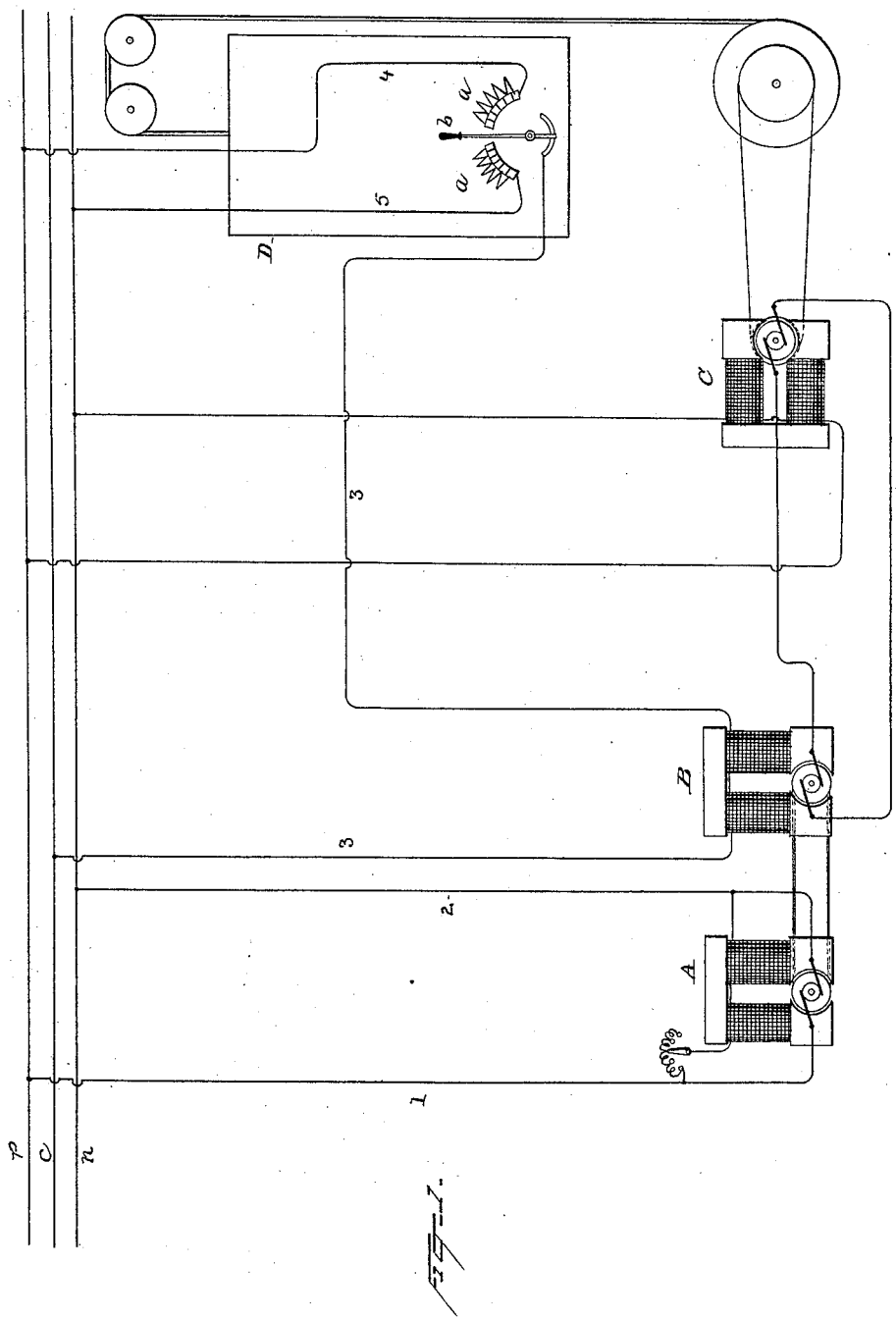

(No Model.)  2 Sheets—Sheet 1.

H. W. LEONARD.
ELECTRIC ELEVATOR.

No. 468,100.  Patented Feb. 2, 1892.

Witnesses  
Norris G. Clark  
N. F. Oberlé

Inventor  
H. Ward Leonard,  
By his Attorneys  
Dyer & Seely.

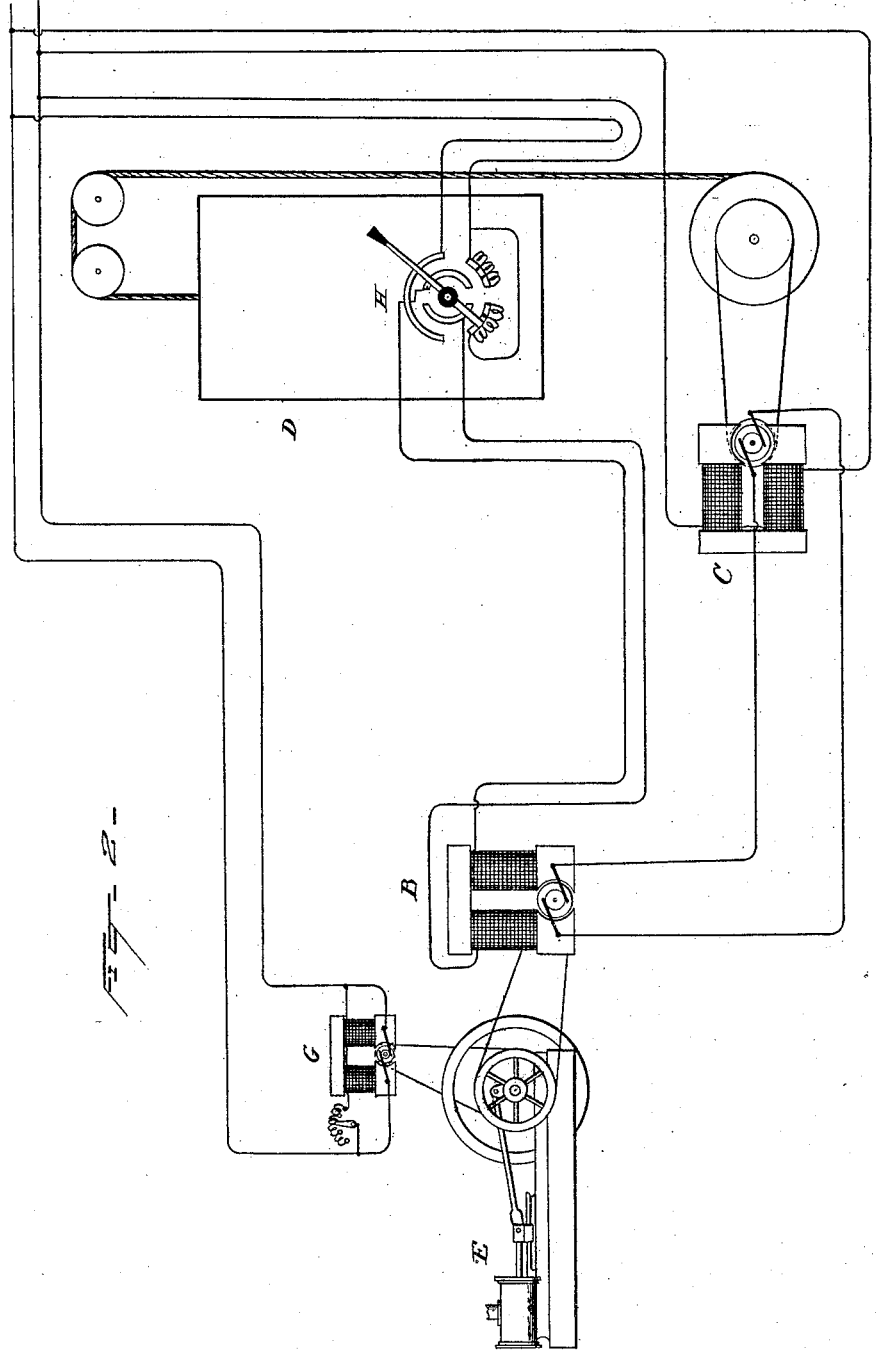

UNITED STATES PATENT OFFICE.

HARRY WARD LEONARD, OF NEW YORK, N. Y.

ELECTRIC ELEVATOR.

SPECIFICATION forming part of Letters Patent No. 468,100, dated February 2, 1892.

Application filed August 31, 1891. Serial No. 404,217. (No model.)

*To all whom it may concern:*

Be it known that I, HARRY WARD LEONARD, a citizen of the United States, residing at New York city, in the county and State of New York, have invented a certain new and useful Improvement in Electric Elevators, of which the following is a specification.

This invention relates mainly to the operation of elevators by electric motors; and my objects are mainly to enable the speed of the elevator-car to be varied without varying the torque or rotary effect of its armature so long as the weight is not varied and without varying the efficiency of the motor, and also to enable the speed and direction of movement to be controlled from the car itself in a simple and convenient manner. To accomplish this I mechanically connect the operating-motor with the elevator-car in any suitable manner, and I so arrange and connect said motor that the strength of its field-magnet remains constant, its speed being varied by altering the electro-motive force on the circuit supplying the motor-armature by means of a controlling device situated in or upon the elevator-car, such device also serving to reverse the direction of rotation of the motor. By this arrangement, the principle of whose operation is more fully explained in my application, filed August 14, 1891, Serial No. 402,651, the motor is made to have the same efficiency at different speeds and the same torque at different speeds if the weight moved remains the same. This is a feature of great importance in elevator work. Since the field is kept at a constant strength, no sparking occurs at the commutator-brushes, for the non-sparking point does not change materially.

In the accompanying drawings, Figure 1 is a diagram illustrating my invention in connection with an Edison three-wire system, and Fig. 2 a diagram showing its use with an isolated two-wire plant.

Referring first to Fig. 1, $p$, $n$, and $c$ represent conductors of the three-wire system. A circuit 1 2 from the outer conductors supplies the field and armature of a shunt-wound electric motor A, which I term the "intermediate motor," and which is mechanically connected with the armature of a dynamo-electric generator B, which I call the "intermediate generator," and which supplies the armature of the working motor C, which is suitably geared to the elevator-car D to operate the same. The field of the motor C is supplied by a multiple-arc circuit from the three-wire system.

Within the elevator-car is the controlling device consisting of two sets of adjustable resistance-coils $a$ and $a'$, and between them a switch-handle $b$, to which is permanently connected the wire 3, which passes to the field-magnet of the generator B and thence to the neutral wire of the three-wire system. From the extremity of the resistance-coils $a$ wire 4 extends to the positive conductor of the three-wire circuit, and from resistance $a'$ wire 5 extends to the negative three-wire conductors.

To start the elevator, the switch-handle $b$ is moved upon either resistance $a$ or $a'$, whereupon the field-magnet of generator B is energized, and said generator supplies the armature of motor C, so as to start the car; but the electro-motive force supplied to the motor-armature is low on account of the resistance $a$ in the field-circuit of the intermediate generator. To increase the speed, the switch-arm is moved so as to cut out resistance, which varies simply the electro-motive force supplied to the armature of the working motor and does not affect the field-magnet thereof, so that variations in speed are produced for any given weight moved without materially varying the torque or efficiency and without altering the non-sparking point. To run the motor in the opposite direction, the switch-arm is moved to the adjustable resistance $a'$, which reverses the field-magnet of the generator B, and so reverses the rotation of the motor C.

In Fig. 2 E is an engine or motor of any kind mechanically connected with the armature of the generator B to run the same. Generator B supplies armature of motor C, which is connected with the elevator-car.

G is an exciting-machine, run, preferably, by the same power as the generator B, and supplying by separate multiple-arc circuits the fields of the generator B and motor C. The field-circuit of the generator B runs to the elevator-car and is there connected with a suitable reversing and resistance-controlling switch H, by means of which the field-magnet of the generator B is strengthened, weakened, or reversed to raise, lower, and reverse the electro-motive force on the armature-supplying circuit of the motor C with the result hereinbefore described. It will be seen that in both the arrangements described the reversal of the electro-motive force is accomplished at a time when the same is at a minimum and that to reverse the motor the electro-motive force of the supplying generator is first gradually reduced to a minimum point, then reversed, and then gradually raised to the point desired.

What I claim is—

1. The combination of an electro-dynamic motor and a dynamo-electric generator having their armatures electrically connected together and both having separately-excited field-magnets, means for varying the strength of the field-magnet of the generator, and means for reversing the field-magnet of the generator, substantially as set forth.

2. The combination of an elevator-car, an electric motor connected with said car to move the same, a dynamo-electric generator supplying the armature of said motor, the field of said motor being separately energized, an adjustable resistance on the elevator-car in the field-circuit of said generator, and means for reversing the said generator, substantially as set forth.

3. The combination of an elevator-car, an electric motor connected with said car to move the same, a dynamo-electric generator supplying the armature of said motor, the field of said motor being separately energized, and the field-circuit of said generator being led to the elevator-car and containing thereat an adjustable resistance and a circuit-reverser, substantially as set forth.

4. The combination, with a three-wire circuit, of a working motor, a generator supplying the armature of said motor, an electric motor running said generator, said last-named motor being supplied from the said three-wire circuit, a branch from the three-wire circuit including the field-magnet of the working motor, and a controlling-switch consisting of two adjustable resistances and an arm movable from one to the other, said arm being connected with the neutral wire of the three-wire systems, and the said resistances being connected, respectively, with the positive and negative wires thereof, substantially as set forth.

5. The method of reversing the motion of an electric motor, consisting in reversing the field-magnet of the generator supplying the armature of said motor, substantially as set forth.

6. The method of reversing the direction of rotation of a motor having a separately-excited field-magnet, which consists in reversing the electro-motive force of the generator supplying the armature of the motor, substantially as set forth.

7. The method of reversing the direction of rotation of an electric motor, which consists in gradually reducing the electro-motive force of the generator supplying the motor to a minimum, then reversing the electro-motive force of the generator, and then gradually increasing it, substantially as set forth.

8. The method of operating and regulating an electric motor, consisting in supplying its field-magnet and its armature from separate sources, varying the electro-motive force of the generator supplying the armature of the motor to vary the speed of said motor, and reversing the electro-motive force of the said armature-supplying generator to reverse the direction of rotation of said motor, substantially as set forth.

This specification signed and witnessed this 25th day of August, 1891.

H. WARD LEONARD.

Witnesses:
 ARPAD VON BARBER,
 W. PELZER.